Dec. 19, 1922.
W. F. LAUTENSCHLAGER.
FRICTION CLUTCH.
FILED OCT. 16, 1919.
1,439,314.
2 SHEETS—SHEET 1.
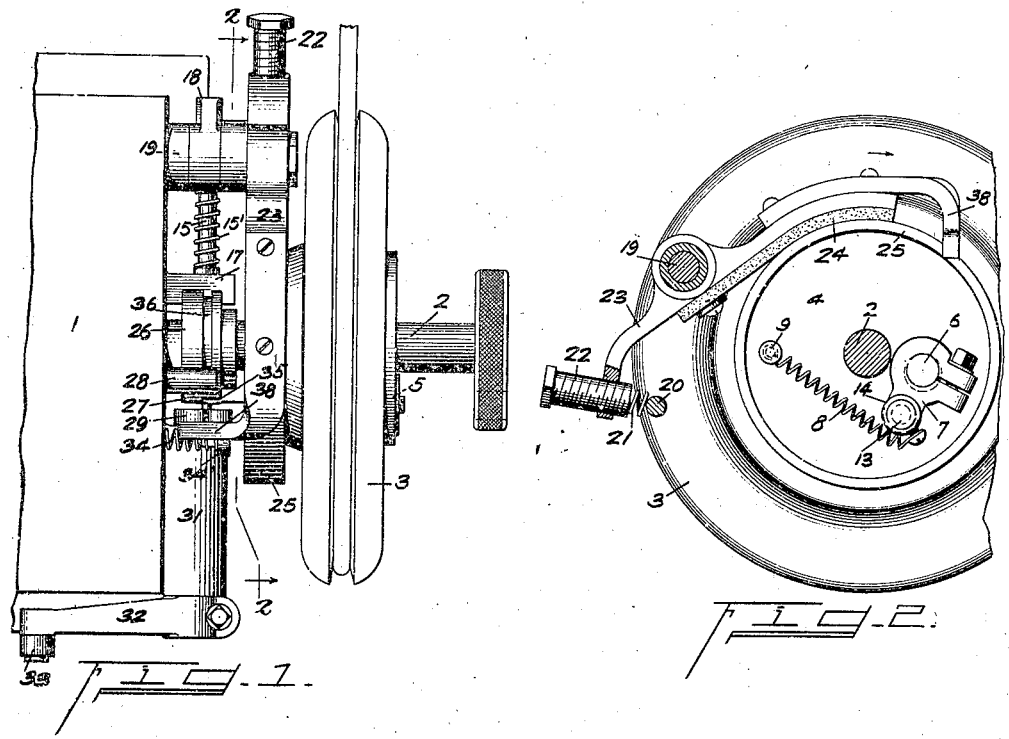
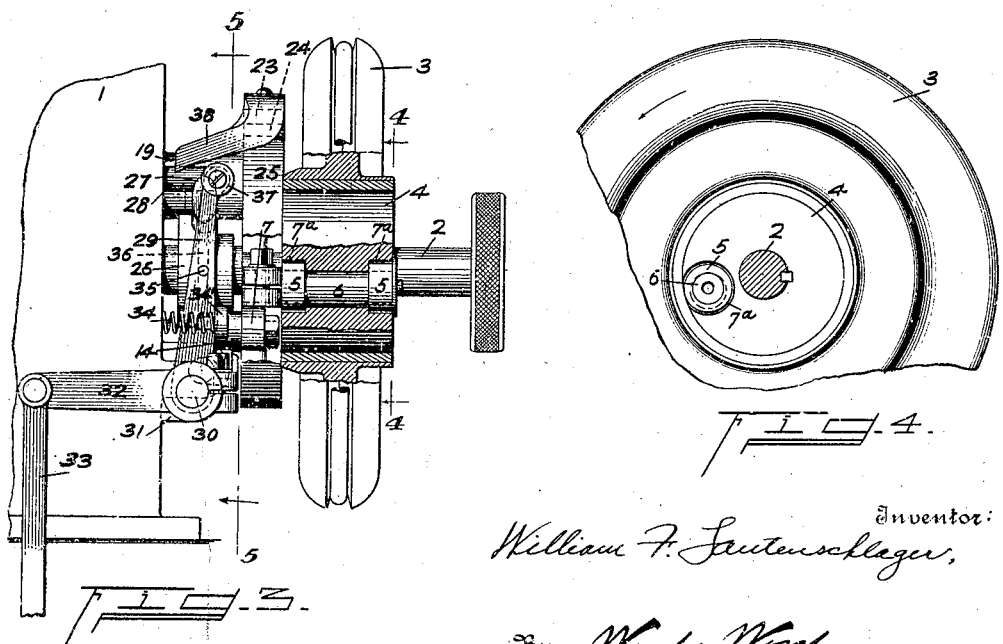
Inventor:
William F. Lautenschlager,
By Word & Word
Attorneys Dec. 19, 1922.
W. F. LAUTENSCHLAGER.
FRICTION CLUTCH.
FILED OCT. 16, 1919.
1,439,314.
2 SHEETS—SHEET 2.
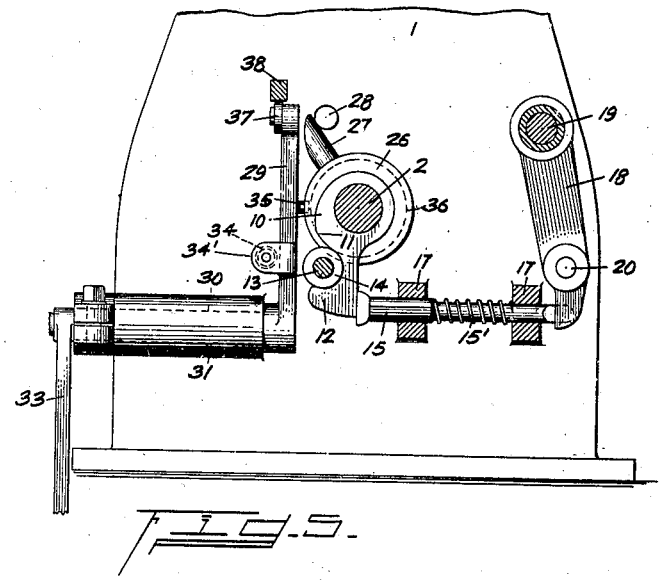
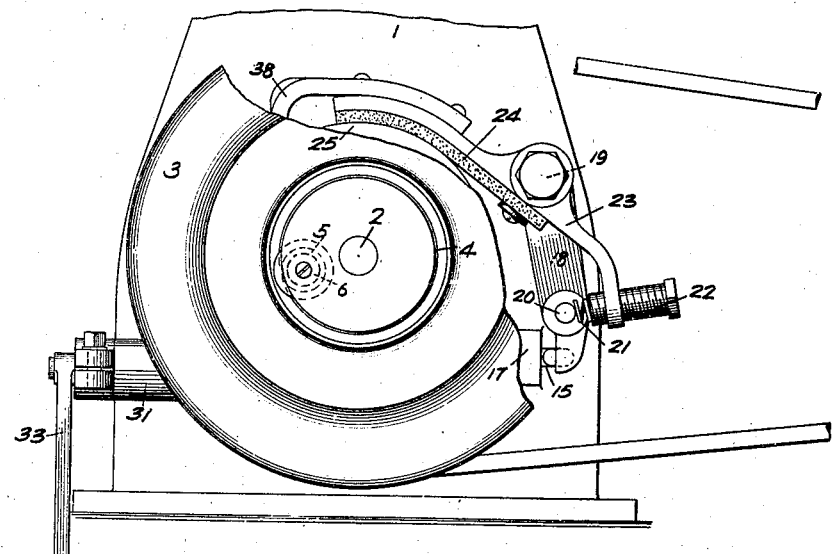
Inventor:
William F. Lautenschlager,
By Wood & Wood
Attorneys Patented Dec. 19, 1922.

1,439,314

UNITED STATES PATENT OFFICE.

WILLIAM F. LAUTENSCHLAGER, OF CINCINNATI, OHIO, ASSIGNOR TO LORENZ MUTHER, OF NEWTON, MASSACHUSETTS.

FRICTION CLUTCH.

Application filed October 16, 1919. Serial No. 331,090.

*To all whom it may concern:*

Be it known that I, WILLIAM F. LAUTENSCHLAGER, a citizen of the United States, and residing at Cincinnati, in the county of Hamilton and State of Ohio, have invented a new and useful Improvement in Friction Clutches, of which the following specification is a full disclosure.

My invention relates to a quick-acting friction clutch and braking mechanism for a single revolution or cycle shaft or transmission control, particularly adaptable for high speed machines operated intermittently and at great frequency.

An object of the invention is to provide a clutch which will automatically frictionally connect the driving member to the driven member when the clutching device is released, and in which the clutching device is automatically and forcibly moved into its binding relationship with the members to be connected and in a direction whereby its binding grip will be increased through any advancing rotation of one member over the other.

Another object of the invention is to provide a simple, durable and quick-acting friction clutch easily controlled and comprising one or more rollers or cylindrical members eccentrically journaled between the driving and driven elements to be connected, whereby through a slight oscillatory motion of the axis of said rollers the parts may be connected or disconnected.

Another object of the invention is to utilize the centrifugal and percussion force of a transmission member after it has been disconnected form its power drive for operating brake mechanism and imparting its own braking pressure, increasing with the continuance of rotation for effectively and nonharshly stopping the rotation of said member.

Another object of the invention is to provide a driven transmission member, with means for controlling and actuating clutching mechanism, whereby the power will be automatically cut off at a definite point or end of an operating cycle of the transmission member and through its own rotating motion, and through any centrifugal velocity thereof, or percussion force, impart, after the power has been cut, a variable braking force against itself for resisting rotation.

Further objects and advantages will be more fully set forth in the following description of the drawings, accompanied herewith, and forming a part of this specification, and in the drawings like characters of reference denote corresponding parts through the several views.

Figure 1 is a top plan view of my improved clutch and braking mechanism.

Figure 2 is a section on line 2—2, Fig. 1.

Figure 3 is a side elevation of the clutch with parts shown in section.

Figure 4 is a section on line 4—4, Fig. 3.

Figure 5 is a section on line 5—5, Fig. 3.

Figure 6 is an end elevation of the clutch and driving pulley with a portion of the pulley broken away to display parts which would otherwise be hidden thereby.

Referring to the drawings, 1 indicates the frame of the machine or bearing in which the shaft 2 is journaled. This shaft may represent the main driving shaft of the machine and is driven or rotated by a grooved belt pulley 3 when clutched together. The clutch and controlling mechanism therefor is particularly adapted for high speed power transmission and for single revolution shaft control, in which the shaft may be brought positively and definitely to rest after a single revolution, bringing the mechanism operated by the shaft to a normal or starting position.

The pulley 3 normally is loosely mounted upon a hub-block 4 fixed upon the shaft 2 and is frictionally locked or clutched to the hub-block by a pair of rollers 5—5 mounted upon a cam or crank shaft 6, within the hub-block extending parallel with the main shaft 2. The rollers are arranged within recesses 7ª, 7ª, respectively formed in the opposite sides of the hub-block. The recesses are open to the periphery of the hub-block to permit the rollers to be moved beyond the periphery of the hub-block for frictional engagement under a wedge-like action with the bore surface of the pulley 3. When the cam shaft is rotated in an appropriate direction, the rollers are moved outwardly against the bore surface of the pulley, frictionally binding the pulley 3 to the hub-block 4 and shaft 2. The rollers are moved eccentrically in a direction forcing the rollers outwardly from the periphery of the hub and rotatably in a direction which will cause an additional binding force between the engaged parts under any free rotative influence of the pulley upon the hub to increase its binding or wedging force for frictionally binding the parts together.

The cam or eccentric shaft is rotated or swivelled by a crank arm 7 fixed or frictionally clamped upon the end of the shaft 6, the end of said shaft projecting beyond the end face of the hub-block. The crank arm 7 is held under spring tension in one direction by a spring 8 having one end fixed to the crank arm and its opposite end to a pin 9 secured in the side face of the hub-block 4. The spring yieldingly forces and moves the crank arm in a direction which will rock the cam shaft in a direction for forcing the rollers into engagement with the inner bore surface of the pulley for frictionally clutching the pulley to the shaft, thus providing a variable stroke for the eccentric shaft, insuring a sufficient shaft throw to insure movement of the rollers into frictionally engagement with the pulley bore surface necessary to effect a binding grip between the parts engaged, and accommodate for any wear of the rollers or bore hub surface of the pulley.

The crank arm and its eccentric shaft are thus automatically operated as soon as they are released or capable of being moved by the tension of the spring 8. The clutch parts are disengaged by a cam member 10 loosely mounted upon the shaft 2 and slidable longitudinally on said shaft for disengaging the crank arm from said cam member.

The cam member 10 has a peripheral cam surface of a proper outline to move the crank arm 7 in a direction which will rotate the eccentric shaft to disengage the rollers from their frictional bind or engagement with the inner bore surface of the pulley, moving the rollers inward within the periphery of the hub-block, permitting the pulley to revolve freely upon the hub-block.

11 indicates the cam surface upon the periphery of the cam member 10 located at a point for a given limit of rotation of the shaft 2. At the end of the cam surface the crank arm engages with a hook-like projection 12, extending from the cam member for arresting the rotation of the hub-block and its shaft 2, bringing the shaft to a definite stopping point at the end of a revolution or cycle.

The crank arm 7 is provided with a crank pin 13, carrying a roller 14, which normally rides over the periphery of the cam member 10 and engages into the hook notch of the hook extension 12 of the cam member at the end of a revolution, as is shown in Fig. 5.

To relieve the parts of undue shocks and strains due to percussion when the crank arm 7 engages against the stop hook extension 12, I provide a spring-tensioned plunger 15 as a buffer engaged against the extension 12 and slidable within bearing lugs 17, 17, projecting from the main frame 1.

15' indicates a spring disposed between the bearing lugs 17 engaging with the plunger 15, yieldingly forcing the plunger into engagement with the extension 12. The opposite end of the plunger 15 engages with a brake actuating lever 18 pivoted upon a stud bolt 19 fixed to a projection from the frame 1. The brake actuating lever 18 has a pin 20 projecting therefrom, engaging against the end of a spring 21 socketed within a setscrew 22, threaded through one end of the brake lever 23, pivoted upon the stud bolt 19. The opposite end of the brake lever 23 has a shoe or liner 24, preferably of fibrous material, fixed thereon, bearing against the periphery of the brake wheel or rim extension 25, concentric with and fixed to the hub-block 4.

Thus when the stop extension 12 is moved rearwardly, it forces the plunger 15 rearwardly against the tension of the spring 15', swinging the brake actuating lever 18, which in turn exerts the force against the spring 21, swinging the brake lever to apply a braking pressure against the brake wheel 25, whereby the shaft is arrested against rotation through the tension of the spring 15', and additionally through the braking force applied upon the brake wheel 25. The braking tension can be adjusted by regulating the set screw 22, which is necessary for different rates of shaft velocity.

The cam member 10 is provided with a peripherally grooved collar 26, for shifting the cam member laterally upon the shaft 2 to disengage the clutch crank arm 7 from the cam member for clutching the pulley to the shaft 2. The cam member 10 is limited against rotating or swivelling in one direction by a stop lug 27, projecting from the collar 26, and engaging against a stop pin 28, projecting from the main frame 1. The cam member is shifted by a shifting arm 29, fixed to a rock shaft 30, journaled in the bearing extension 31 from the side frame 1. The opposite end of the rock shaft is provided with a crank arm 32 fixed to the rock shaft 30 and pivotally connected to a treadle rod 33, which extends downwardly. 34 represents a spring interposed between the frame 1 and lug extension 34', projecting from the shifting arm 29 for yieldingly forcing the shifting arm in a direction for normally maintaining the cam member 10 in alignment with the roller of the crank arm 7.

The shaft arm 29 has a pin 35 projecting laterally therefrom and engaging into the groove 36 in the shifting collar 26, whereby the shifting collar and its cam member 10 connect with the shifting arm for moving the cam member upon the shaft 2 to disengage the crank arm from the cam member.

The free end of the shifting arm 29 is provided with a roller 37 engaging an arm extension 38 fixed to the brake lever 23, for actuating the brake lever to release the brake with the clutch control as long as the shifting arm 29 is engaged with the brake arm extension 38. This relieves the shaft of the braking pressure in a starting period of rotation. The brake is also released from the brake wheel as long as the shifting arm remains in its operated position for continuous rotation of the shaft 2.

Having described my invention, I claim:

1. In a device of the class described, a driven member, a driving member normally loosely journaled upon said driven member, means for operatively connecting and disconnecting said members, said means comprising a shaft eccentrically mounted on said driven member, a roller eccentrically and loosely mounted upon said shaft, engageable with said driving member, to couple said members for rotation in unison, a crank arm upon said eccentric shaft to rotate the same in its ways to disconnect said driving member and means for operating said crank predeterminedly in relation to the unitary rotation of said driving and driven members.

2. In a device of the class described, driving and driven members, an eccentric roller clutch for connecting and disconnecting said members, a clutch controlling a crank member, a sliding and non-rotatable cam member cooperating with said crank member for single rotation control of said driven and driving members and means for operating said sliding and non-rotatable cam member.

3. In a device of the class described, driving and driven members, an eccentric roller clutch for connecting and disconnecting said members, a clutch controlling crank, a sliding cam member cooperating with said crank for disconnecting said driving member, spring-tension buffer means cooperating with said crank, and with auxiliary braking means for arresting rotation of said driven member.

4. In a device of the class described, driving and driven members, a clutch for connecting and disconnecting said members having a clutch controlling crank rotating with said driven member, a cam member cooperating with said crank for releasing said clutch and arresting the rotation of said driven member, a spring tension buffer engaged with said cam, and a brake engaging said driven member, operated by said buffer for imparting a braking pressure against said driven member, the momentum of said driven member supplying the force for operating said brake.

5. In a device of the class described, driving and driven members, a clutch for connecting and disconnecting said members having a clutch controlling crank rotating with said driven member, a cam member cooperating with said crank for releasing said clutch and arresting the rotation of said driven member, a spring tension buffer engaged with said crank, and a brake engaging said driven member, operated by said buffer for imparting a braking pressure agianst said driven member, and an adjustable yielding coupling connecting said buffer and brake the momentum of said driven member supplying the force for operating said brake.

In witness whereof, I hereunto subscribe my name, as attested by the two subscribing witnesses.

WILLIAM F. LAUTENSCHLAGER.

Witnesses:
L. A. BECK.
M. S. BARRON.